US 6,647,117 B1

(12) United States Patent
Wallace et al.

(10) Patent No.: US 6,647,117 B1
(45) Date of Patent: Nov. 11, 2003

(54) CONTINUITY OF VOICE CARRIED OVER DSL DURING POWER FAILURE

(75) Inventors: Andrew D Wallace, Harlow (GB); Christopher Tate, Bishop's Stortford (GB); Mark Bridger, Hertford Heath (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/374,806

(22) Filed: Aug. 16, 1999

(51) Int. Cl.[7] .............................. H04M 1/00; H04M 9/00
(52) U.S. Cl. .................. 379/413; 379/1.03; 379/395.01
(58) Field of Search .................................. 379/1.01, 1.04, 379/12, 22, 27.01, 27.06, 28, 399.01, 399.02, 413, 414, 1.03; 370/352, 216, 241, 242, 248, 252

(56) References Cited

U.S. PATENT DOCUMENTS

| 4,853,949 | A | | 8/1989 | Schorr et al. ................... 379/2 |
| 5,216,704 | A | | 6/1993 | Williams et al. ............... 379/93 |
| 5,418,776 | A | | 5/1995 | Purkey et al. ................. 370/16 |
| 5,883,941 | A | | 3/1999 | Akers ....................... 379/93.08 |
| 5,889,856 | A | * | 3/1999 | O'Toole et al. ............. 379/399 |
| 6,272,209 | B1 | * | 8/2001 | Bridger et al. ................ 379/27 |
| 6,282,204 | B1 | * | 8/2001 | Balatoni et al. ............ 370/421 |
| 6,400,803 | B1 | * | 6/2002 | Tate et al. ................ 379/27.06 |
| 6,404,763 | B1 | * | 6/2002 | Renucci et al. ............. 370/352 |
| 6,452,923 | B1 | * | 9/2002 | Gerszberg et al. .......... 370/352 |
| 6,466,573 | B1 | * | 10/2002 | Renucci ....................... 370/352 |
| 6,512,762 | B1 | * | 1/2003 | Renucci et al. ............. 370/352 |
| 2002/0181677 | A1 | * | 12/2002 | Park ........................ 379/93.07 |
| 2002/0181697 | A1 | * | 12/2002 | Bolla et al. ............. 379/399.01 |
| 2003/0035523 | A1 | * | 2/2003 | Mansfield ................ 379/93.07 |
| 2003/0041030 | A1 | * | 2/2003 | Mansfield ..................... 705/50 |

FOREIGN PATENT DOCUMENTS

| EP | 0 984 612 | 3/2000 | |
| GB | 2 313 979 | 6/1997 | |
| WO | 0189262 A2 | * 11/2001 | ........... H04Q/11/04 |

* cited by examiner

Primary Examiner—Binh Tieu
(74) Attorney, Agent, or Firm—Barnes & Thornburg

(57) ABSTRACT

A digital subscriber loop modem arrangement is arranged to respond to a fault condition so as to provide at least a voice lifeline service over DSL service on a digital subscriber line in which data and voice traffic are transported on a plurality of carriers. On detection of a power loss at the subscriber end of the line, the number of carriers is reduced so as to maintaining transmission only of those carriers transporting the voice traffic. This reduces the power demand which can now be met from the remote end of the line. A method of operating a digital subscriber loop modem arrangement under a fault condition so as to provide at least a voice over DSL service on a digital subscriber line in which data and voice traffic are transported on a plurality of carriers, the method comprising the steps of: replacing the data with random data, disabling those data carriers on which the random data is transported, and maintaining transmission of those carriers transporting the voice traffic.

15 Claims, 4 Drawing Sheets

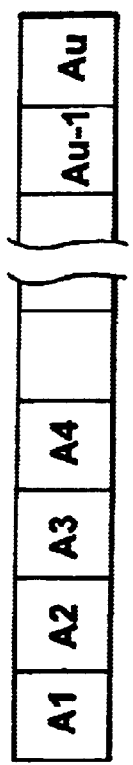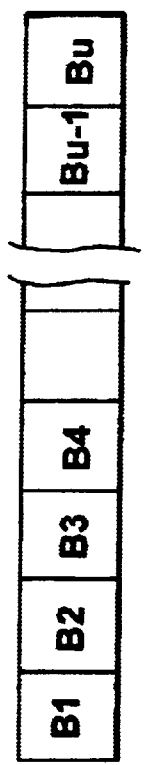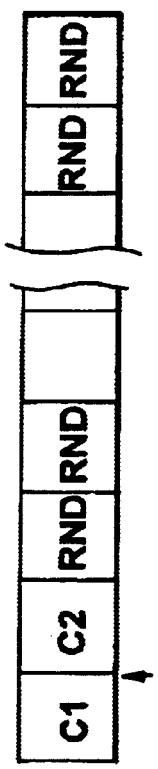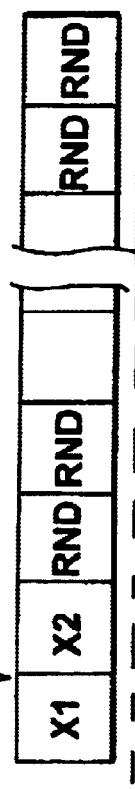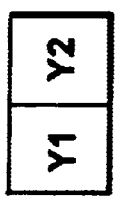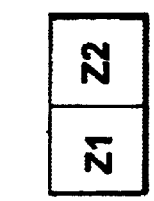
Fig. 4a    Fig. 4b    Fig. 4c

CONTINUITY OF VOICE CARRIED OVER
DSL DURING POWER FAILURE

FIELD OF THE INVENTION

The present invention relates in general to telecommunications, and in particular to a method and apparatus for facilitating continuity of Voice over Digital Subscriber Loop (VoDSL) service to a subscriber during power failure and restoration at the customer premises, and a system incorporating the same.

BACKGROUND TO THE INVENTION

Digital Subscriber Une (DSL) modem technology has enabled the transmission of digital information at duplex rates from 144Kbits/s to over 1 Mbts/s over the subscriber loop. The demand for additional, telephone lines and integrated telephony and data services has given rise to Voice over DSL (VoDSL) solutions. For example a VoDSL system may provide 4 voice channels carried within the digital data over a single twisted pair subscriber loop from a Une Terminating Equipment (LTE) located in the Central Office to a Customer Premises equipment (CPE). In one implementation a VoDSL system carries the voice channel(s) in band as encoded data within the data stream and therefore there is no baseband POTS (Plain Old Telephony Service) as would be the case with for example ADSL or G.Lite. Unlike normal telephony the derived voice method of VoDSL requires local power at the CPE to perform the modulation and demodulation.

Conventional, analogue. POTS telephony over a twisted pair to the LTE has the benefit that during power failure at the customer premises emergency calls can still be placed since the line and the handset at the customer premises are powered from the central office. A disadvantage of existing VoDSL modems is that the amount of power required for normal operation could severely limit the operational loop length and not provide a service able to reach the majority of consumers. This has limited deployment of VoDSL systems to subscribers having an additional conventional POTS line which can be used In the event of power failure. Absence of support for lifeline services has therefore severely hindered deployment into the small business and especially the residential market.

Power feed from LTE has been tried for ISDN but it requires very high battery voltages and severely limits the operational loop length.

Use of batteries at the CPE to provide backup power in the event of power failure presents other problems: batteries may be bulky and therefore unattractive to subscribers; batteries require periodic maintenance to ensure reliability; and battery faults may not be detected until a local power failure occurs and they fail to provide power to the CPE and hence provide lifeline support, which defeats the object of their presence in the system.

OBJECT OF THE INVENTION

The invention seeks to provide an improved method and apparatus for Digital Subscriber Loop services in general and provision of improved lifeline capabilities during customer premises power failure in particular.

SUMMARY OF THE INVENTION

According to a first aspect of the present invention there is provided a method of operating a digital subscriber loop modem arrangement under a fault condition so as to provide at least a voice over DSL service, the method comprising the steps of: switching from a full-power digital subscriber loop functionality to a reduced-power digital subscriber loop functionality responsive to detection of loss of power to said arrangement.

According to another aspect of the invention, there is provided a method of operating a digital subscriber loop modem arrangement under a fault condition so as to provide at least a voice over DSL service on a digital subscriber line in which data and voice traffic are transported on a plurality of carriers, the method comprising the steps of: replacing the data with random data, disabling those data carriers on which the random data is transported, and maintaining transmission of those carriers transporting the voice traffic.

According to a further aspect of the invention, there is provided a method of providing continuity of service at a subscriber premises In a digital subscriber loop system the, method comprising the steps of:

detecting power loss at said premises; and switching customer premises equipment to a low-power mode capable of being powered from a local exchange connected to said customer premises equipment.

According to another aspect of the Invention, there is provided a digital subscriber loop modem arrangement comprising, a local power supply port, a circuit arranged to detect a loss of power at said electrical power input port; and arranged upon detection of failure of a power supply connected to said power supply port to switch from a full-power digital subscriber loop functionality to a reduced-power digital subscriber loop functionality.

Advantageously, the system avoids the need to provide battery backed up equipment at the customer premises, and the attendant need to keep the batteries in good condition, and yet, still allows a "lifeline" voice-over-DSL service to be provided In the presence of power loss at the CPE.

Advantageously, providing a viable strategy for provision of lifeline service during a power outage at the customer premises facilitates the carriage of POTS traffic in-band in ADSL.

Advantageously, a complete modem retrain is avoided thereby achieving continuity of service over the power outage.

Advantageously, a seamless transition is achieved during power-down.

The invention is also directed to a method by which the described apparatus operates and including method steps for carrying out every function of the apparatus.

The Invention also provides for a system for the purposes of digital signal processing which comprises one or more instances of apparatus embodying the present invention, together with other additional apparatus.

The invention is also directed to software for a computer, comprising software components arranged to perform each of the method steps.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the Invention are now described below by way of example only and with reference to the accompanying figures in which:

FIGS. 4a to 4c illustrate a method of preserving data during transition from normal power to low power operation.

DETAILED DESCRIPTION OF INVENTION

Figure 1:
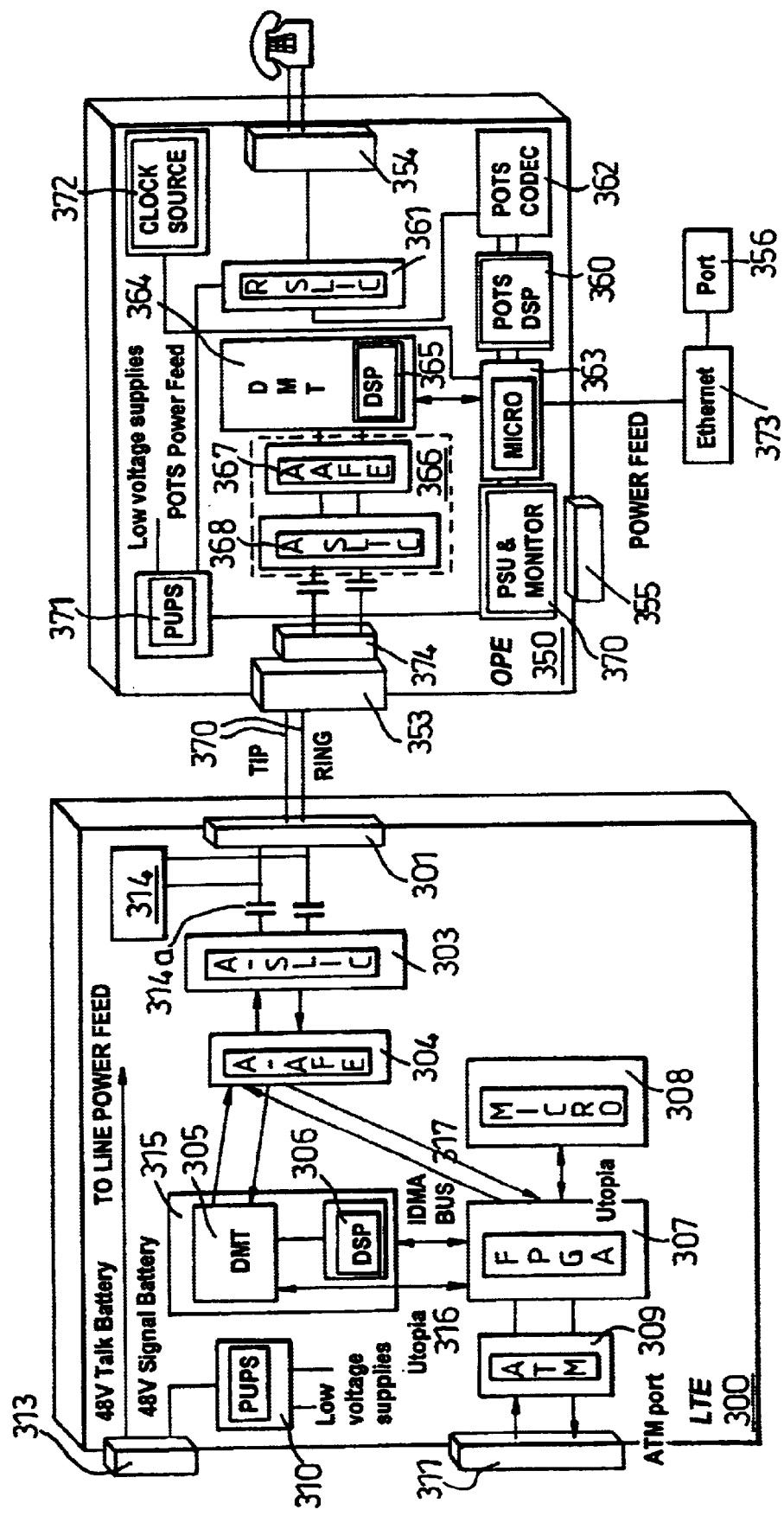
FIG. 1 shows a first embodiment of a system in accordance with the present invention.

Referring to FIG. 1 there is shown a block circuit diagram of a subscriber loop arrangement In accordance with the present invention. The arrangement comprises Line Terminating Equipment (LTE) located at a central office, a subscriber loop connection (for example twisted copper pair), and Customer Premises Equipment (CPE) locally connected to at least one telephony terminal. The CPE comprises PUPS-POTS power feed 371, a POTS Ringing Subscriber Line Interface Circuit (R-SLIC) 361, and ADSL control microprocessor 363, ADSL line transceivers ASLIC, an analogue-to-digital analogue AAFE converter, a modem data pump DMT, an ATM processor 363, a voice coding, echo cancellation, and DTMF processor 360, and an ethernet interface.

The VoDSL modem itself comprises ringing subscriber line interface circuit (R-SLIC) 361, POTS coder/decoder (POTS codec) 362, a POTS digital signal processing unit (POTS DSP) 360, a processor 363 (for example Motorola MPC850/0860 PC™), discrete multi-tone modem (DMT) 364 incorporating a digital signal processing (DSP) 365 capability, an ADSL analogue frontend 366 incorporating coder/decoder functions (A-AFE) 367, a ADSL subscriber line interface circuit (A-SLIC) 368 (including an ADSL driver), and a pair of high pass filters 369a–b (for example shown symbolically as a capacitor). The functional component listed above are connected in series in the order listed between the local telephony port 354 and the subscriber loop port 353. The modem also comprises a programmable clock source 372, a point-of-use power supply 371, a mains power supply unit and monitor 370, a mains power feed interface 355, an ethernet physical layer interface unit 373, and an ethernet port 356. In normal operation power is supplied via the power feed port 355 to the PSU 370 and from there to the point-of-use power supply 371 from which a low voltage supply is provided to the other components. The PUPS 371 also provides POTS power feed to the R-SLIC 361. A connection is also provided from the PSU 370 to the microprocessor 363 by means of which an Indication of power failure can be passed from the PSU to the microprocessor to initiate entry into low power mode. The clock source 273 is coupled to the microprocessor 363 whereby to allow the microprocessor to vary the clock rate. The dock paths (not shown) are provided to distribute the clock signals to other components in the modem. The microprocessor 363 is also connected via the ethernet physical interface unit 373 to the ethernet port 356. The AAFE 367 performs analogue-to-digital and digital-to-analogue conversion.

The LTE VoDSL line card comprises N line power feed circuits,. N DSL SLIC 303, a board control microprocessor 308, N DSL line transceivers, N DSL codecs, N DSL data pumps, an ATM processor 309, and a management interface. Turning now to the LTE 300 at the central office, this comprises a subscriber loop port 301, an A-SLIC 303 (including an ADSL driver), an ADSL analogue frontend 304 (A-AFE), a pair of high-pass filters 314a–b (shown symbolically as capacitors), a discrete multi-tone modem (DMT) 305 incorporating a digital signal processing (DSP) 306 capability, a field programmable gate array (FPGA) 307, a processor 308 (for example Motorola MPC 805/860 power PC™), an asynchronous transfer mode (ATM) interface 309, an ATM port 311, a point-of-use power supply (PUPS) 310, and an external power supply interface 313. The LTE also comprises a line power feed circuit 314 supplied from external power supply Interface 313 and providing power feed to the subscriber loop interface 301.

In normal operation as a VoDSL modem the operational parts of the LTE are connected as follows.

The ATM port 311 is connected to the ATM interface 309 by means of a standard ATM physical layer Interface such as ATM 25.6 Mbits/s. The ATM interface connects to the FPGA 307 by means of a standard ATM parallel interface such as UTOPIA 316. The FPGA connects to the DMT modem 305 also by means of a UTOPIA interface. The DSP within the DMT modem logically connects to the microprocessor 308 by means of a parallel microprocessor bus (for example IDMA bus) 317, but physically signals are routed via the FPGA 308 to provide the necessary glue logic. The processor 307 is also connected to the FPGA by means of a UTOPIA Interface. The DMT modem connects to the A-AFE 304 via separate receive and transmit databuses connected via digital bus switches 314. The AAFE connects to the A-SLIC by means of receive and transmit analogue differential pairs. The A-SLIC connects to the line 370 by means of a two wire differential pair via line interface 301 and the pair of high pass filters 314a–b.

In normal operation data and voice is carried within ATM cells, using the data ATM Adaption layer 5 (AAL5) and the voice using ATM adaption layer 2 (ML2). LTE VoDSL line card—downstream direction.

ATM cells are received by the LTE line card 300 across a UTOPIA-50 backplane interface 311. These cells comprise voice band data encoded in ATM cells, optionally using AAL2, and also TCP/IP data carried in a separate VC encoded as AAL5, (or possibly carried in the same VC, encoded as AAL2), with a differing Channel Identifier CID ( . . . ) from that of the POTS/voice data.

These cells are passed through the line card ATM processor 309 and FPGA 307, which directs the cells towards the appropriate DMT encoding data pump engine 315.

The DMT encoder 305 converts this binary data by processes which will be well understood by those expert in the field, but based around the scrambled and interleaved encoding of this data onto QAM constellations, with flexible bit-carrying capacity, and an inverse Fast Fourier Transfer FFT ( . . . ), to transform said frequency domain QAM constellations to the time domain, and adding a cyclic extension to improve the resilience of the system to time domain dispersion effects of the twisted air cables and analogue filters.

The DSL codes AAFE 304 converts the digital DSL samples from the data pump into an analogue signal. The A-SLIC 303 amplifies the output of the DSL codec, and is capable of launching sufficient DSL power to achieve several kilometers of transmission.

Line power feed circuit 314 provides for the injection of a DC voltage, for provision of a DSL sealing current, or for remote powering of the CPE during power failure. Unlike voice under DSL systems, there is no need for a high-pass filter to protect the POTS against ingress of DSL signals—the whole band down to 4 kHz is available for DSL transmission.

The high-pass filters 314a–b serve only to protect the A-SLIC 303 from the high voltage power feed from the line power feed circuit 314.

The twisted pair port 353 is connected to the A-SLIC 368. A wetting current circuit 374, typically comprising a balanced low pass filter and resistor in series is placed across the port 353 and provides a DO path, sinking a few millianperes in normal operation. This provides a sealing current, to reduce the effects of rectification at oxided contacts.

The A-SLIC 368 contains a hybrid, separating the received signal from that transmitted by the CPE.

The A-SLIC 368 connects to the A-AFE 367, which contains a variable gain amplifier and an analogue-to-digital converter.

This analogue-to-digital converter digitises the incoming DSL signal, and when the DMT modem 364 has been trained, the output of the FFT after equalisation will be the same constellations (degraded by the combined effects of dispersion, noise and attenuation along the twisted) as were present at the LTE. These constellations can be decoded, and after de-interleaving, unscrambling and error correction, give rise to the same sequence of ATM cells as was present at the LTE input to the DMT encoder for this line. These cells are passed from the DMT modem 364 to the ATM and control microprocessor 363 across a UTOPIA bus. The voice-data, voice-path signalling and data network packets contained in this cell stream are de-multiplexed by the microprocessor 363. Data network packets are output on a data network port, such as ethernet, ATM-25 or USB port. FIG. 1 illustrates the Ethernet case, where data network packets from the microprocessor 363 are passed over a serial bus to an Ethernet physical layer interface (PHY) 373 and Ethernet port 356.

Data packets will have been carried to the CPE from the ISP using PPP over AAL5, or other similar protocol. The data must be extracted from this protocol stack, and re-encoded in the form expected by the LAN clients, e.g. PPTP or L2TP. This function can be performed within the microprocessor 363.

Voice-path signalling packets are decoded and acted on, to control ringing and calling line ID services (CLI).

The microprocessor 363 is connected to a POTS DSP resource 360. This DSP resource is responsible for decompression of the voice data to A/$\mu$-law, if voice compression has been used, echo cancellation of the local echo introduced by the R-SLIC 361 and user POTS and comfort noise generation. Control of the operation of this DSP resource 360 is effected over an interface to the control $\mu$-P 363, which allows signalling messages to cause a change in the mode of the DSP, e.g. to change the voice coding bit rate or comfort noise parameters.

The DSP resource 360 is in turn connected to a multiplicity of POTS CODECs 362, each contains a digital to analogue converter, used to convert the A/*-law data back to an analogue signal. For the sake of simplicity only one POTS interface is shown in FIG. 1.

Each POTS CODEC 362 is connected to a ringing subscriber line interface circuit (R-SLIC) 361. The R-SLIC 361 used contains a ringing amplifier to generate the voltage and current drive needed to make the phone ring. The amplifier is driven by a low power ring waveform generated under the control of the microprocessor 363. The R-SLIC 361 contains a line power feed circuit allowing the feed voltage generated by the PUPS to power the user's POTS phone. It also contains a 4-wire to 2-wire interfacing the CODEC to the telephony port 354 with echo return loss being kept as high as feasible.

This description focusses on a preferred implementation where voice circuits are provided using POTS interfaces. The techniques described will be transferable to other types of voice interface e.g. ISDN 'S' interfaces, which could also be present in a VoDSL system.

The POTS Interface port 354 connects to the POTS R-SLIC 361, and received voice signals are separated from the signal to be transmitted by the hybrid contained within. The R-SLIC 361 also allows detection of hook-state (i.e. on or off hook) and a connection between the R-SLIC 361 and the microprocessor 363 ensures that this status can result in the generation of signalling packets when the hook status changes. The R-SLIC 361 will be connected to a POTS CODEC 362, which digitises the analogue signal, typically encoding the signal as A or $\mu$-law.

The digitised signal from the POTS CODEC 362 is connected (along with the digitised signals from the other POTS CODECS) to a POTS DSP resource 360. The DSP resource 360 is responsible for coding of voice signals to lower bit-rates (e.g. 32 kbit/s ADPCM), local echo cancellation, silence suppression, and DTMF digit recognition. The DSP resource 360 will have a control interface to the microprocessor 363, which will allow responsive action to, and generation of, signalling messages by the processor 363.

The physical layer Interface 373 receives data packets from the LAN port 356. The LAN connection could be one of many types of interface, for example ATM-25, Ethernet or USB. An Ethernet interface is shown in FIG. 1. The LAN data will typically be encapsulated in a PPTP (point-to-point tunnelling protocol) or L2TP (layer-2 tunnelling protocol) stack or similar. The embedded data will be extracted by the microprocessor 363, and re-encapsulated using PPP to be ISP using PPP over ATM in AAL5 encapsulation, or similar.

At the same time, voice data from the POTS DSP resource 360 is encapsulated using AAL2, for transmission to the remote PSTN voice gateway. The AAL2 minicell size may be chosen differently for normal/low-power mode, to maximise transmission efficiency at the expense of delay in the low-power mode. The three resulting ATM streams (voice data, voice-path signalling and ISP data) are merged, and the resulting combined ATM stream is passed to the DMT modem 364 for encoding.

The DMT modem 364 contains a FEC encoder, scrambler and interleaver, and is capable of operating at a programmable sample rate, and with flexible re-provisioning of bit-rate "on-the-fly". The basic operation of the DMT modem will be well understood by those expert in the field, and will be as in the downstream direction, albeit reduced bandwidth and bit-rate by comparison under normal circumstances.

The DMT modem 364 provides a control interface to the microprocessor 363.

This allows the microprocessor 363 to control the operating mode of the DMT modem. In particular, it enables the microprocessor 363 to control the transition of the DMT modem 364 into low-power mode during lifeline operation.

The DMT modem 364 connects to the AC 0 DEC 367. This contains a digital-to-analogue converter and encodes the DMT as an analogue signal.

The programmable clock source 372 will provide a sample clock appropriate for normal or low-power mode. It also provides clock signals for several other devices in the system, such as the microprocessor 363, the DMT modem 364 and the POTS DSP resource 360, providing a clean transition to lower clock frequencies when operating in low-power mode.

The A-CODEC 367 in turn connects to the A-SLIC 368, which includes the line driving amplifiers and hybrid. Unlike normal DSL hybrid/SLIC, there is no need to prevent egress of the DSL signal into the POTS audio band, the whole band down to 4 kHz is usable.

The A-SLIC 368 is connected to the twisted pair port 353 through high-pass filters 369a–b. The high-pass filters 369a–b are provided merely to protect the A-SLIC 368 from the power feed voltages present on the line.

The external power feed port 355 connects to an internal power supply (in the case of external mains supply) and PSU monitor 370. The PSU monitor 370 indicates failure of the external mains supply within a few cycles and has an interface to the microprocessor 363 to generate an interrupt or allow polling. The reservoir capacitors within the power supply must store sufficient charge to allow normal operation of the modem from the time of power fail, to the point at which line powering becomes possible. At this point, the PUPS 371 can be powered solely from the line until power is restored.

The PUPS 371 must be capable of operating in two states under the control of the control $\mu$-P 363. In the low power mode, power can be turned off to the ethernet (or other LAN) PHY 373, and the voltage supplied to the A-SLIC 368 can be reduced.

On detection of loss of power to the customer premises equipment in a voice-over-DSL installation, the CPE switches Into a low-power mode, so that it operates from power which is supplied by DC feed down the subscriber line alone, without the need for support from any other external power source.

This low-power mode achieves lower power consumption by a combination of one or more of the following:

1. reducing the number of active carriers, both upstream and downstream,
2. reducing the power of the active carriers, both upstream and downstream,
3. operating the line driver/receivers from lower power rails
4. reducing the data rate carried by the system, optionally dropping support for data services
5. modifying the POTS ring cadence to reduce overall power consumption.
6. reducing the voltage feed to the POTS line(s)
7. reducing the clock speed of the FFT processing engine
8. reducing the capacity of the voice coding/EC/DTMF engine to 1 channel
9. in the case of AAL 2 ATM voice transport, use a profile which gives efficient usage of ATM cells
10. reducing POTS support to a single active POTS channel. This may Involve dropping some calls in progress.

The transition to low-power mode occurs without requiring the modem to retrain, which would require several seconds downtime with consequent interruption of service.

This is achieved by sending a command over the AOC (ADSL operations channel) indicating a target symbol number to switch operating mode, and a target bit-rate, which must be one of the allowed bit rate values, given an integral number of bits being transmitted in each symbol.

The target symbol In which to make the switch must be a sufficient time in the future to allow for transmission over the AOC channel and computation of the new bit-allocation, transmit power tables and receive equaliser coefficients.

Clock divider circuitry must be designed to allow a clean switch from normal mode clocks to low-power mode clocks, in order that no glitches occur, which could potentially disrupt the operation of the logic.

The interleave algorithm allows parameters to be modified on-the-fly, and the following steps are taken to ensure that this transition is seamless (i.e. no data bytes are lost).

FIGS. 4a to 4c illustrate a preferred method of minimising or preventing data loss during the transition from normal power to low power operation.

FIG. 4a illustrates the interleaved user data under the normal operating conditions. When the change to low power operation is triggered, a guard period is provided (FIG. 4b) during which flushing of significant data out of the interleaver is performed by the Insertion of random padding bytes (RND) in the transmitted data, leaving only those data fields (C1, C2 ... X1, X2) that will be occupied by user data in the low power condition. This data will typically be voice traffic. When the user data has been flushed, (FIG. 4c), only the remaining small number of bytes (Y1, Y2 ... Z1, Z2) carrying the priority or voice traffic are transmitted over the loop. On return to full power operation, the process is reversed.

The key to such seamless operation is to ensure that for a time period equal in duration to the depth of the interleaver and finishing at the time at which the DSL channel drops back to its lower capacity lifeline mode, that the user data is limited to the lower capacity and padded out to the actual capacity, for example with bytes from a pseudo random data sequence.

The user data must be inserted only in those positions which will be visited by the interleaver output algorithm after changing to the lower data rate.

In this fashion, it can be ensured that when the interleaver changes mode to the lower capacity, all the user data bytes will be successfully transferred from interleaver input to output, only pseudo random data bytes will be lost.

Some padding bytes will be carried across the channel during the changeover, but these will be discarded by the action of switching the bit rate of the de-interleaver at the other end of the DSL circuit.

On power restoration, the above changes must be reversed, again without requiring a complete retrain, although action may need to be taken to restore normal operation on carriers which have been inactive during power outage.

These actions will consist of:

1) using the mains supply for PUPS operation, rather than line fed power;
2) enabling wetting current circuits, to maintain xDSL signal quality.
3) restoring line driver supply voltage to its normal value;
4) increasing all clock rates to their original values;
5) restoring power to ethernet circuits and re-initialising the interface;
6) establishing equaliser coefficients on carriers which have been out of use;
7) establishing potential bit allocations on all carriers;
8) transferring bit allocation tables between CPE and CO;
9) enabling the new FEQ coefficients and bit allocation tables;.
10) reprogramming interleaver and RS parameters on-the-fly in such a fashion that no data bytes are inserted or lost from the ATM stream as the user data transport rate is restored to its original value.

DETAILED DESCRIPTION

The VoDSL system under consideration normally supports up to 4 POTS lines. In lifeline mode, it supports only one line.

A single POTS phone typically consumes 0.25W when off-hook. It is feasible to supply up to 1.0W down a POTS line by DC feed. This means that the active elements in the CPE must consume no more than 0.76W when in lifeline mode. This is significantly below the current typical operating power of commercially available ADSL chipsets, which typically consume 1.5W in normal operation. A typical VoDSL CPE consists of the elements with associated normal and lifeline power budgets as shown in Table 1.

TABLE 1

CPE components and power budgets

| Component | Normal | Lifeline |
|---|---|---|
| PUPS-POTS power feed | 0.15 W | 0.15 W |
| POTS SLIC | 0.05 W | 0.05 W |
| ADSL control microprocessor | 0.10 W | 0.05 W |
| ADSL line transceivers | 0.90 W | 0.20 W |
| A-D-A | 0.30 W | 0.05 W |
| Modem data pump | 0.30 W | 0.05 W |
| ATM processor | 0.75 W | 0.15 W |
| Voice coding-EC-DTMF | 0.05 W | 0.01 W |
| Ethernet interface | 0.15 W | 0.00 W |
| Totals | 2.75 W | 0.71 W |

The sole requirement In lifeline mode is to carry one channel's worth of voice and signalling data, and provide line power feed to one phone circuit. An upstream/downstream ADSL bandwidth of 40 kbit/s is enough to carry ADPCM coded voice in AAL2 and signalling traffic.

The ethernet interface can be disabled completely. If continuity of data service is required, then the VoDSL CPE is powered from the same UPS (Uninterrupted Power Supply) as is used for the computing equipment.

The voice DSP processing requirement can be reduced to that of processing a single channel's voice coding, echo cancellation (EC) and DTMF digit recognition. This allows the clock frequency of the DSP microprocessor to be reduced: in a preferred embodiment by at least a factor of four.

The maximum voice encapsulation load drops by a factor of four. The data processing load drops to zero, because the ethernet circuit is not supported during lifeline. Therefore, the clock speed to the ATM processor can be reduced by at least a factor of four, with a corresponding reduction in power consumption.

The FFT computation dominates the power consumption of the digital modem. By a reduction in the upstream number of carriers from 32 to 8 or 4 and from 256 to 32 or even lower for the downstream, the processing requirements within the DMT digital engine are substantially reduced, allowing the use of a lower frequency clock or bursted clock. This requires that the FFT size used In each direction be programmable.

The sampling frequency used for the A/D and D/A converters in the ADSL modem can be reduced by the same factor as the FFT size is reduced. A transformation must be applied to the (TDEQ) coefficients when the sample rate is changed, to ensure that the transition is seamless.

The load on the ADSL control microprocessor is reduced, due to the lower number of carriers to maintain In fallback mode. Its clock frequency can be correspondingly reduced.

Potentially the largest power saving comes from the ADSL analogue front end, where the amplitude of the signals to be transmitted is significantly reduced, partly because far fewer carriers are in operation in the fallback mode, and partly because the power transmitted on each active carrier may be reduced. The resulting DMT signal therefore has a lower peak to mean ratio, especially in the upstream direction, where the number of active carriers is reduced to 8 or even 4. Furthermore, it has a lower total power. This means that the analogue line driver in particular is able to operate from lower supply rails than in the normal operation case.

Figure 2:
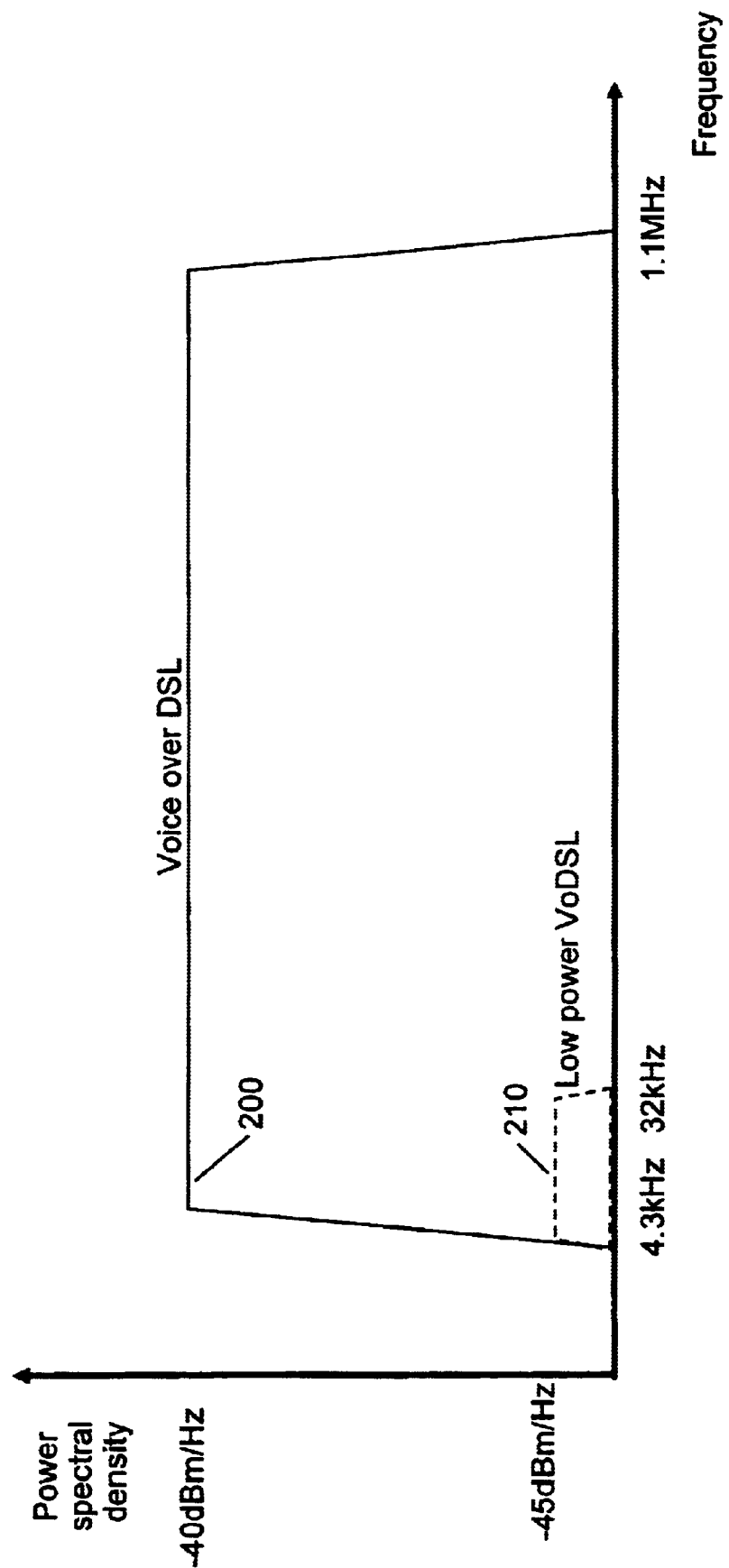
FIG. 2 shows example graphs of power spectral density versus frequency in accordance with the present invention.
Figure 3:
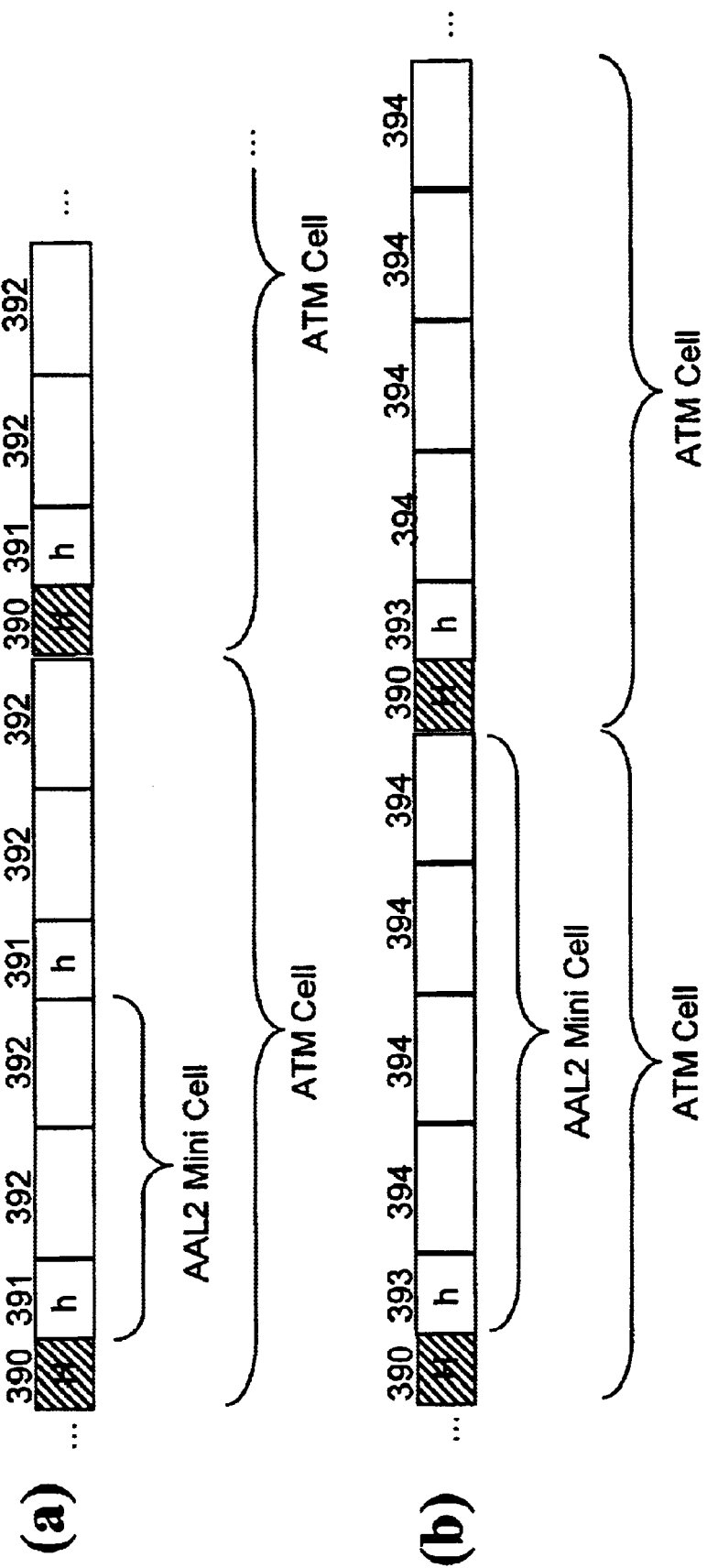
FIG. 3 shows an example of AAL2 cell structure in accordance with the present invention.

Referring now to FIG. 2 there is shown a graph of power spectral density against frequency both for normal Voice over DSL mode, and for low-power mode. In a typical arrangement for normal mode transmission, VoDSL utilises a band from approximately 4.3 kHz up to 1.1 MHz at a power of approximately −40 dBm/Hz; in low-power mode the system operates over a reduced band from 4.3 kHz to 32 kHz and at a reduced power, for example in the order of −45 dBm/Hz. In terms of frequency bands this represents a reduction from around 256 carriers in normal mode to something in the order of 8 carriers in low power mode. It is not necessary that carriers utilised in low-power mode are adjacent, though It is preferred that they are located at the lower frequency end of the VoDSL band, because the attenuation of the copper pairs is lowest at these frequencies.

The desire to achieve a seamless transition places great demands for good power supply rejection on the transceiver components, in order to avoid a burst of errors as the power rails drop to their lower fallback value.

Circuitry normally present to ensure that a wetting current is drawn from the ADSL copper line is disabled. The CPE draws sufficient current when in fallback mode to ensure wetting.

There is very little time to make the change from normal to lifeline mode before the power rails start to collapse. A very short message exchange must therefore result in the CPE and CO equipment falling back to low-power support mode. For example, there is not sufficient time to completely renegotiate bit allocations and reduced power levels. A systematic or defined algorithmic transformation is applied to existing bit allocation tables and transmit power/receive FEQ coefficients to ensure that the changeover from normal to fallback mode can happen quickly. For example, the power on all active carriers may be reduced by a fixed amount (e.g. 5 dB) on entering fallback mode. This requires the FEQ coefficients at the CO to be multiplied by the corresponding amount at the CPE. Similarly the bit allocation tables at both CO and CPE are updated according to a predefined algorithm to achieve a 40 kbit/s (or other predetermined bit rate) both for upstream and downstream paths.

As the loss of power is detected by the power supply monitor within the CPE, a message Is sent across the AOC (ADSL operations channel) to the CO, indicating a loss of power at the CPE, nominating a symbol sometime into the future on which the channel capacity is to change, and nominating a target number of user data bits per symbol to be carried.

The delay must be large enough to ensure that the message can be successfully conveyed across the AOC in the presence of typical levels of impulse noise and RFI, and to allow calculation of the new system parameters based on the target capacity. It must, on the other hand, be short enough that operation from charge stored in the PUPS reservoir capacitors is possible until low-power mode is established.

To ensure the reliable operation of DSL service, it is necessary to prevent non-ohmic contacts forming at joints in the loop and distorting the signal. This Is achieved by supplying some sealing current of about 1–2 mA by applying a voltage on the line at the Central Office. To create a sealing current, there needs to be some form of DC sink at the CPE. By placing this at the input to the CPE modem, it will be behind the switching used to re-route the line through to the telephone on lifeline mode. Thus when the power goes down at the CPE and the switch changes over to the lifeline position, the sealing current will cease. This is detected at the Central Office, in the same way that off-hook is detected and it too goes into lifeline mode. The voltage supplied for sealing becomes the line battery voltage for POTS. When a telephone goes "off hook", the current drawn by the terminal is detected by the Central Office equipment in the usual way. This current will typically be greater than 20 mA and so is distinguishable from the sealing current. Thus when the CPE modem has power restored, the switches will be activated to connect the line to the modem and the current drawn will return to about 1–2 mA. Detection at the Central Office will indicate that the CPE modem has restored power, so it will in turn switch back to DSL mode.

In a modification of the arrangement of FIG. 1, a current sink in the form of a high resistance path between Tip and Ring may be connected to the path between the switch and the high-pass filter.

As the wetting current is drawn through a low-pass filter network, the transition point per se will be ill-defined at the CO, due to the effects of dispersion through the low-pass filter. The effects of this dispersion can be mitigated by using the symbol number to define a limited set of possible switchover points, for example, only on every 10th symbol. As the symbol number can be kept in synchronism between the CPE and CO, the CPE can be restricted to changing the wetting current state every 10th symbol, say, and allowing a fixed number of symbols to elapse, say 100, after that change of wetting current state, before implementing the change to bit allocation, bit rate and transmit power tables.

Likewise the CO can sample the wetting current state 9 symbols after every 10th symbol, and change the modem operational state when a fixed number of symbols have elapsed after the wetting current state change, say 91 symbols later.

In this manner, the poor resolution in time of the change in wetting current can be mitigated.

By contrast, the process of restoration of normal mode service may be relatively relaxed, although the transition should still seem seamless from a user's perspective. Many carriers will be re-enabled after what may be several hours of disuse. The FEQ coefficient used for each such carrier should be re-established prior to normal data transmission. This can be performed, for example, by transmitting a known pseudo random sequence modulated onto a 4 QAM constellation. The received values can be used to calculate a new value for the FEO coefficients required, prior to resumption of normal operation.

It is possible that two or more calls are in progress when CPE power is lost. Under these circumstances the simplest approach is arbitrarily to select one such call to maintain, whilst dropping the others. This has the disadvantage that an emergency call could be dropped in favour of a non-urgent call. In a preferred embodiment therefore the CPE monitors outgoing dialled digits so as to identify calls made to an emergency number (e.g. 112 or 999 calls). On power failure identified emergency calls are given preference over non-emergency outgoing phone calls. In the case of multiple emergency calls in progress, then again an arbitrary choice may be made.

Maintaining an incoming phone call must take priority over allowing new calls. A periodic disrupter tone could be injected in the POTS circuit of the incoming call, to ensure that an incoming call is finished promptly in the event of power fail, and hence free up the POTS channel for other outgoing calls.

It is possible that the modem will need to retrain while the power outage at the customer premises persists. In this case, the modem retrains in limited bandwidth mode, and hence the TEQ and EC coefficients are only calculated in the presence of the limited bandwidth signals. In this case, it is not possible to restore the TEQ coefficients and EC coefficients when restoring full-bandwidth operation. One solution to this problem is to wait until the lifeline call terminates, and then perform a full retrain.

Since a power outage at the CPE could be of uncertain duration, it is desirable to maintain the lifeline service; not only during the outage, but also during subsequent power restoration, since re-establishing the POTS over DSL service could take precious time. The present invention also provides a method for such maintenance of calls in progress during CPE power restoration.

Any range or device value given herein may be extended or altered without losing the effect sought, as will be apparent to the skilled person for an understanding of the teachings herein.

What is claimed is:

1. A method of operating a digital subscriber loop modem arrangement under an electrical power fault condition so as to provide at least a voice over DSL service on a digital subscriber line in which non-voice data and voice traffic data are transported on a plurality of carriers, the method comprising the steps of: detecting an electrical power fault at said digital subscriber loop modem arrangement; in response to said detected electrical power fault, triggering a guard period during which at least the non-voice data is replaced with random data; disabling those data carriers on which the random data is encoded; and transmitting those carriers on which the voice traffic data is encoded.

2. A method according to claim 1, wherein it includes the step of providing continuity of service at a subscriber premises by switching a customer premises equipment incorporating said digital subscriber loop modem arrangement to a low-power mode capable of being powered from a local exchange connected to said customer premises equipment.

3. A method according to claim 1, wherein the method comprises the step of switching the digital subscriber loop modem arrangement from a full-power digital subscriber loop functionality to a reduced-power digital subscriber loop functionality in response to detection of said electrical power fault.

4. A method according to claim 3, wherein said guard period is chosen as being equal in duration to the period it takes for the digital subscriber loop modem arrangement to switch from its full-power functionality to its reduced-power functionality.

5. A method according to claim 3, wherein switching of the digital subscriber loop modem arrangement from a full-power functionality to a reduced-power functionality includes reducing power on a previously active carrier in at least one of an upstream direction and a downstream direction.

6. A method according to claim 3, wherein switching of the digital subscriber loop modem arrangement from a full-power functionality to a reduced-power functionality includes providing a reduced data rate on said carriers.

7. A method according to claim 3, wherein switching of the digital subscriber loop modem arrangement from a full-power functionality to a reduced-power functionality includes reducing voice-coding/EC/DTMF capacity to support a reduced number of channels.

8. A method as claimed in claim 3, wherein traffic is encoded via a Fast Fourier Transform processing engine, and wherein switching of the digital subscriber loop modem arrangement from a full-power functionality to a reduced-power functionality includes reducing clock speed of said Fast Fourier Transform processing engine.

9. A method according to claim 3, wherein switching of the digital subscriber loop modem arrangement from a full-power functionality to a reduced-power functionality includes operating line drivers and receivers from lower-power rails.

10. A digital subscriber loop modem arrangement comprising: a local electrical power input port; a circuit arranged to detect a loss of power at said electrical power input port; a circuit arranged to respond to said detection of loss of electrical power by triggering a period such that a data encoder for encoding non-voice data and voice traffic data onto carriers is caused to replace at least the non-voice data with random data from a pseudo-random data generator; and a transmitter circuit for disabling those carriers on which the random data is encoded and transmitting those carriers on which the voice traffic data is encoded.

11. An arrangement according to claim 10, wherein it includes a circuit arranged upon detection of failure of a power supply connected to said electrical power input port to switch said digital subscriber loop modem arrangement from a full-power digital subscriber loop functionality to a reduced-power digital subscriber loop functionality.

12. An arrangement according to claim 11, additionally comprising: a subscriber loop port, said port being arranged upon detection of failure of said power supply to draw power from a remote power supply connected to said subscriber loop port.

13. An arrangement according to claim 11, additionally comprising: a local telephony port; wherein said reduced digital subscriber loop functionality is sufficient to support at least one voice channel both at said subscriber loop port and at said local telephony port.

14. An arrangement according to claim 11, wherein said reduced digital subscriber line functionality is carried over a set of carrier frequencies reduced with respect to that prior to said power failure.

15. An arrangement according to claim 11, wherein said reduced digital subscriber line functionality is carried over a carrier frequency at a power reduced with respect to that prior to said power failure.

* * * * *